Oct. 11, 1966   C. R. BARLOW   3,278,205
COUPLING
Filed May 16, 1963
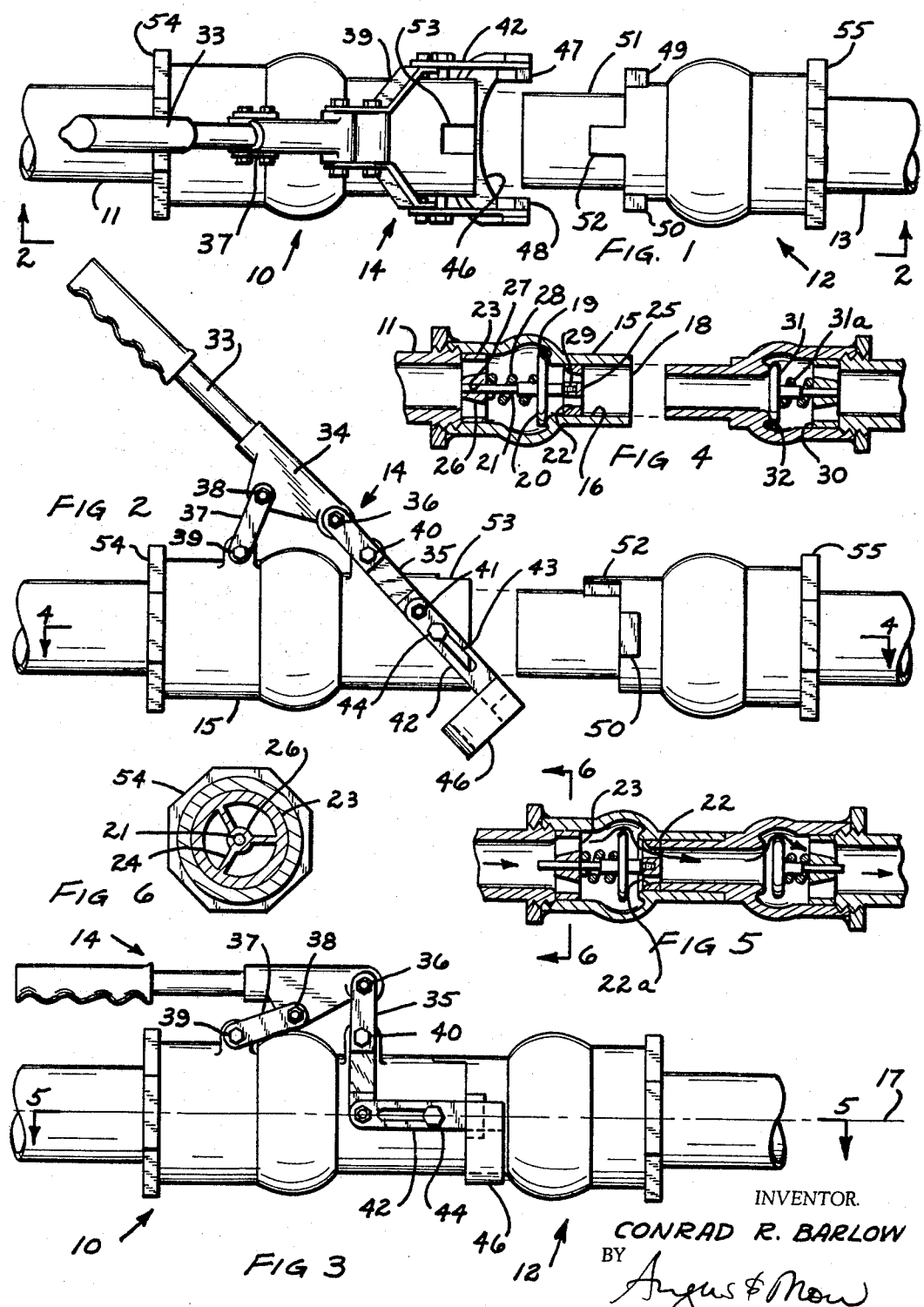
INVENTOR.
CONRAD R. BARLOW
BY
Angus & Mon
ATTORNEYS 3,278,205
COUPLING
Conrad R. Barlow, Redondo Beach, Calif., assignor to Hi-Shear Corporation, Torrance, Calif., a corporation of California
Filed May 16, 1963, Ser. No. 280,941
5 Claims. (Cl. 285—311)

This invention relates to a quick acting coupling to connect two conduits together.

While this invention is generally useful in connecting two conduits, its principal utility is found in applications where speed and reliability of latching one onto the other are paramount requirements. One example is in the field of airborne spray equipment. Agricultural spray-equipped aircraft must operate as nearly continuously as possible in the prime daylight hours of best visibility and least dew. Time lost on the ground is a severe economic loss. The aircraft engines are not even shut down while the slurry tanks are being refilled from a hose. Obviously, time spent fumbling to make a conduit connection is both expensive and fraying to the nerves and tempers of pilots and ground crews alike. On the other hand, the coupling does have to be reliable and not slop poisons on the ground or on the aircraft. It is an object of this invention to provide a coupling which can perform to the necessary standards.

In this device, a conduit extends from the storage tank and is terminated at a connector. A second connector, adapted to be connected with the conduit connector, is attached on a hopper in the plane and extends through the plane fuselage. A coupler is attached to the conduit connector and comprises a clamp adapted to embrace the second connector and connected through a linkage to a lever. The clamp is disposed so that by proper manipulation of the lever, the two connectors will be drawn together.

An object of this invention is to provide a coupling whereby the connectors may be easily connected without any time consuming manipulation of the clamp and lever before the connectors are joined together. Other conduit connectors also employ the use of clamps and levers to connect two connectors together, but they are attached to one of the connectors at only one or two points on each side of the connector. As a result, the levers and clamps are usually in a cumbersome position when one is ready to make the connection. The hose must be held and the clamp and lever must be manipulated into a position to anticipate the engagement of the two connectors. The coupler, in accordance with this invention, it attached at three points of constraint on each side of the connector, such that it is always in a position in close proximity to anticipate the union of the connectors. Because of the three points of constraint, the coupler is restricted from assuming an awkward position and always remains in a substantially controlled position.

It is important that there be no binding or jamming of the two connectors when they are connected which may damage the connectors and result in a leaky connection. A male connector is attached to the hopper and a female connector is attached to the conduit. Due to the disposition and alignment of the linkage between the lever and the clamp, force is applied to the male connector such that it will be in substantial alignment with the female connector as the connection is made. The clamp is locked securely onto the male connector by the lever action causing the linkage to buckle. Due to the buckling action, any force tending to pull the connectors away from each other will make the clamp hold tighter to the male connector.

A preferred but optional feature of the invention resides in the provision of check valves in both of the connectors. The provision of the valves eliminates the necessity of gate valves, or the like, disposed between the storage tank and the connector. The check valves are normally closed due to springs holding them against their valve seats as well as the pressure of fluid within the storage tank. Upon the coupling of the connectors, the male connector forces the check valve in the female connector to open, thereby allowing fluid to pass from the female connector into the opening of the male connector. The pressure of the fluid acts against the spring loaded check valve in the male connector and forces the valve open to allow fluid to flow from the conduit to the hopper.

These and other features of my invention will be fully understood from the following detailed description and accompanying drawings of which:

FIG. 1 is a top view of the coupler showing the connectors before their union;

FIG. 2 is a view taken at line 2—2 of FIG. 1;

FIG. 3 is a side view of the coupler showing the connectors after their union;

FIG. 4 is a cross section view taken at line 4—4 of FIG. 2 showing the condition of the check valves before the union of the connectors;

FIG. 5 is a cross-section view taken at line 5—5 of FIG. 3 and shows the condition of the check valves after the union of the connectors; and FIG. 6 is a cross-section view taken at line 6—6 of FIG. 5.

The drawings show a female connector 10 attached to an end of a conduit 11 and a male connector 12 attached to an end of a conduit 13. Although the drawings show the connectors attached to conduits, it should be understood that the conduits are shown merely as an example of a particular application of the connection of the connectors. One of the connectors may be attached to a hopper as previously described. A coupler 14 is rigidly attached to the female connector and is operable to clamp male connector 12 to female connector 10.

The female connector as shown in FIG. 4, comprises a housing 15, having an inner passageway 16 extending along a longitudinal axis 17 from conduit 11 to an opening 18 at an end of connector 10. A check valve is disposed within the female connector 10, and comprises a valve seat 19 disposed around the inner periphery of the housing 15 and a valve head 20 operable to move along longitudinal axis 17 to open and close the check valve. The valve head is rigidly attached to a stem 21 which extends along the longitudinal axis. Stem 21 is supported within the housing 15 by a sliding ring 22 located adjacent opening 18, and on the opposite side of the valve head from ring 22 is a guide ring 23. Rings 22 and 23 are each attached to a centrally located hub 25 and 26, respectively, by fins such as 24 which extend radially away from the hub as shown in FIG. 6. Sliding ring 22 has a curved surface 22a around its inner periphery to provide a smooth inner wall configuration to decrease turbulence of the fluid as it passes between the connectors.

Stem 21 is slideable along longitudinal axis 17 within a centrally located hole 27 in hub 26. A spring 28 is disposed between valve head 20 and hub 26 causing the valve head to bear against valve seat 19 thereby closing the check valve. The end of stem 21 closest to opening 18 of housing 15 is threaded into a centrally located tapped hole 29 in hub 25 so that the stem is rigidly attached to sliding ring 22.

Guide ring 23 is rigidly held to the wall of housing 15 such as by a press fit. The conduit 11 is threaded into the end of the housing opposite opening 18 and may be brought to bear against ring 23 for additional support. Sliding ring 22 has an outer periphery such that it is slideable within the housing. Stem 21 is rigidly attached to hub 25 such that when the sliding ring is moved longitudinally within the female housing the check valve is caused to open and close.

The male connector 12 and its associated check valve also utilize a guide ring 30 similar to guide ring 23 and a valve head 31 caused to bear against a valve seat 32 by a spring 31a. The male connector does not require the use of a sliding ring to open and close the check valve but is operable by pressure exerted upon valve head 31 from fluid entering from the female connector.

The coupler 14 consists of a lever 33 connected to the female connector by a linkage and when actuated causes a clamp, adapted to engage with the male connector, to be moved into a position forcing the union of the connectors. The lever is attached to a linkage member 34. Member 34 has a front link 35 attached at a front point 36 and a rear link 37 attached at a rear point 38. The rear link 37 is attached at a pivot point 39 on the top of female connector 10.

The front link 35 being the link extending towards opening 18 of connector 10, is attached at a pivot point 40 on the top of female connector 10. Link 35 extends beyond pivot point 40 away from point 36 to an elbow 41 in the linkage. The length of the section of link 35 between front point 36 and pivot point 40 is shorter than the length of the section between pivot point 40 and elbow 41, thus providing a mechanical advantage resulting in a greater distance of travel of elbow 41 compared with the change in position of front point 36. By making a shorter traveling distance of point 36, the travel distance of handle 33 is thereby similarly decreased.

A clamping link 42 having a longitudinally extending slot 43 is attached to elbow 41 at one of its ends. Link 42 is slideable and may pivot about a pivot point 44 on housing 15 by means such as a bolt which passes through slot 43 and is attached to the outside of the housing of the female connector. Pivot 44 is disposed at a point adjacent the opening 18 of connector 10 and is substantially 90° from pivot points 39 and 40 around housing 15. A similar linkage is attached on the opposite side of linkage member 34 and the female connection 10 to the one just described. All links of coupler 14 are connected to linkage member 34 and female connector 10 by a convenient means such as by machine bolts to provide shafts for smooth movement of the links. By providing three points of constraint, being the three pivot points 39, 40 and 44 which hold coupler 14 to female connector 10, the coupler will always be in a controlled position to receive the male connector.

A clamping member adapted to engage itself with the male connector, such as a semi-circular ring 46 having two dogs 47 and 48 attached diametrically opposite each other on the inside of the ring, is attached to the end of each of the clamping links. Dogs 47 and 48 are each disposed and aligned to embrace two lugs, 49 and 50 respectively, attached to male connector 12.

A recessed section 51 on the end of male connector 12 is adapted to fit into female connector 10 and has an outside periphery defined by the inner walls of the female connector. Section 51 is of sufficient length to provide ample sealing surface when inserted into the female connector. A key 52 is disposed on recessed section 51 of the male connector and is adapted to fit into a slot 53 on the wall of housing 15 adjacent the opening 18 of the female connector. The purpose of the key and slot is to orient the male connector with the female connector so that the lugs and the dogs will be aligned with each other. Large nuts 54 and 55 are welded to the housings 10 and 12 of the connectors to provide for easy handling while fastening the connectors to the conduit.

The operation of the conduit coupler is carried out by first raising lever 33 to a position as shown in FIG. 2, where clamping member 45 will be in a position in anticipation of clamping the connectors together. The recessed section 51 of the male connector is inserted into the opening 18 of the female connector until the edge of the wall of the male connector bears against sliding ring 22. Next, the lever 33 is moved downward toward the female connector causing link 37 to move clockwise about pivot 39, link 35 to move clockwise about pivot 40, causing link 42 to move counterclockwise and the dogs to move behind their respective lugs.

The lever is manipulated to a position which is substantially parallel with the longitudinal axis 17 to lock the coupler. When coupler 14 is in a locked position, the linkage has a slight buckle such that a straight line passing from pivot point 39 to rear point 38, if extended, would pass between front point 36 and pivot point 40. Any force acting to pull the connectors apart when the coupler is in a locked position will cause the linkage to try to buckle even more. Member 34 will be forced to bear against housing 15 of the female connector and the coupler will tend to hold tighter to the lugs on the male connector.

When the male connector is moved into the female connector by the action of the coupler, sliding ring 22 is caused to move away from opening 18 by the male connector as shown in FIG. 5, thus causing valve head 20 to be removed from valve seat 19 to open the check valve. Fluid under pressure in conduit 11 will then pass through the female connector and force pressure against valve head 31. If the pressure exerted upon valve head 31 is greater than the pressuer of the spring 31a holding the valve head against valve seat 32, the valve head will be moved toward guide ring 30 thereby opening the check valve of the male connector and fluid will flow from conduit 11 to conduit 13.

As the connectors are joined and the check valves opened, the force exerted upon the male connector by clamping member 45 is substantially parallel with longitudinal axis 17 causing the male connector to be in alignment with the female connector. This is done by causing clamping link 42 to be substantially parallel with longitudinal axis 17 and elbow 41 to be bent substantially 90° when coupler 14 is in a locked position as shown in FIG. 3. The possibility of binding or jamming when the connectors are connected together is decreased, thereby decreasing the possibility of damage to the connectors which might result in a leaky connection.

Withdrawal of the male connector from the female connector is accomplished by merely raising lever 33 and giving the female connector a sharp pull. The connectors will part from each other and the check valves in each connector will close. Only about a cupful of fluid will spill out upon the separation of the connectors; the spillage being the fluid between the check valves at the time of separation.

This invention is not to be limited by the embodiment shown in the drawings and described in the description which is given by way of example and not limitation, but only in accordance with the scope of the appended claims.

What is claimed is:

1. A conduit coupling comprising a coupler to couple two connectors together along a longitudinal axis, said coupler being attached to one of said connectors and comprising a handle and a clamping member and a linkage disposed therebetween linking said handle to said clamping member, said linkage being attached at three axes of constraint to one of said connectors and means carried by the other connector to be engaged thereby.

2. A conduit coupling in accordance with claim 1 wherein said linkage of said coupler comprises a front link, said front link being attached to said connector at an axis of constraint disposed away from either end of said link, said axis of constraint being a pivot point, said front link constituting attached at one of its ends to said handle, said pivot point being closer to said end of said link attached to said handle than to the opposite end of said link, manipulation of said handle causing a larger angular deflection of said link on the end of the link opposite the end connected to said handle.

3. A conduit coupling in accordance with claim 1 wherein said linkage comprises a front link and a rear link, each of said links being connected at one end to said handle, said rear links being connected at one end to said handle, said rear link having a longitudinal axis extending along its length, said front link being attached to said connector at a pivot point disposed away from said end on said front link, said longitudinal axis of said rear link passing between said pivot point and said end of said front link when said connectors are coupled together.

4. A conduit coupling in accordance with claim 1 wherein said linkage comprises a clamping link connecting said clamping member to a front link at an elbow, said front link being attached at one of its ends to said handle and being attached to one of said connectors at a pivot point, said pivot point being disposed from either end of said front link, said elbow being at a right angle when said connectors are coupled together, said clamping link having a longitudinal axis, said longitudinal axis of said connectors being parallel to said longitudinal axis of said clamping link when said connectors are coupled together.

5. A conduit coupling in accordance with claim 1 wherein said linkage is attached to said connector to provide a mechanical advantage in length of travel between said handle and said clamping member, said linkage being buckled when said connectors are coupled together such that a force tending to pull the connectors apart will make said coupling stronger, manipulation of said handle causing said linkage to provide forces to substantially align said connectors when said connectors are coupled together.

References Cited by the Examiner

UNITED STATES PATENTS

| | | | |
|---|---|---|---|
| 1,793,015 | 2/1931 | Roos | 285—311 |
| 2,453,480 | 11/1948 | Williamson et al. | 285—311 X |
| 2,761,469 | 9/1956 | Hansen | 137—614.05 |
| 2,789,838 | 4/1957 | Palm | 137—614.05 |

FOREIGN PATENTS

| | | |
|---|---|---|
| 478,829 | 10/1915 | France. |
| 636,735 | 1/1928 | France. |
| 479,943 | 7/1929 | Germany. |
| 7,257 | 5/1884 | Great Britain. |
| 541,842 | 12/1941 | Great Britain. |
| 708,613 | 5/1954 | Great Britain. |

WILLIAM F. O'DEA, *Primary Examiner.*

ISADOR WEIL, *Examiner.*

J. O'NEILL, H. COHN, *Assistant Examiners.*